No. 718,645. PATENTED JAN. 20, 1903.
W. C. LILLY.
ELASTIC WHEEL TIRE.
APPLICATION FILED DEC. 27, 1901.
NO MODEL.
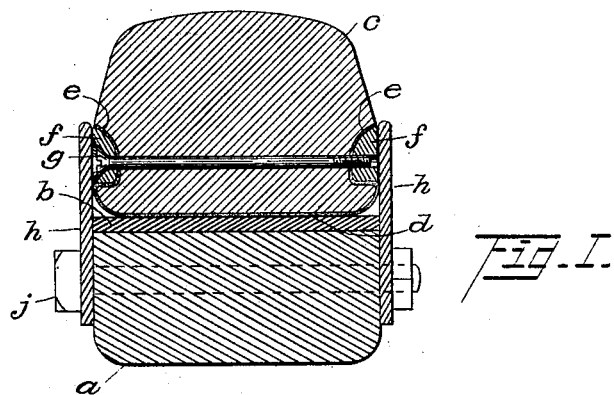
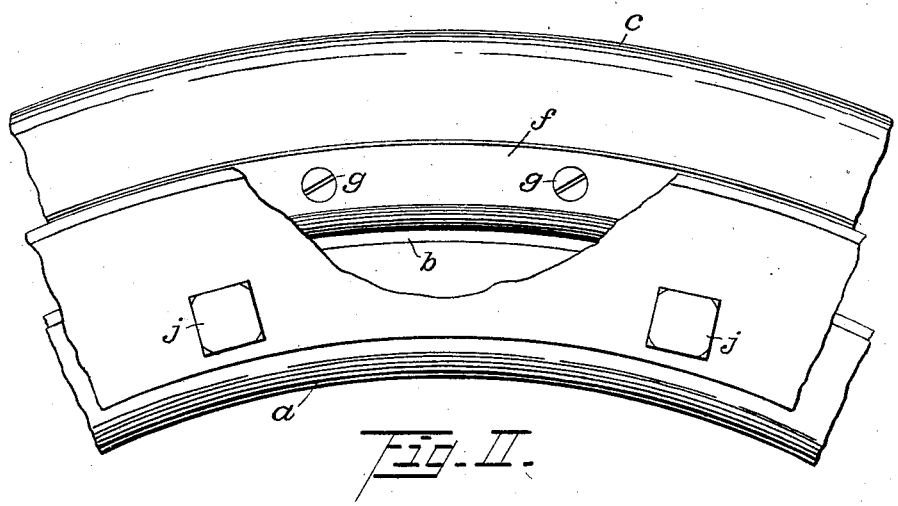
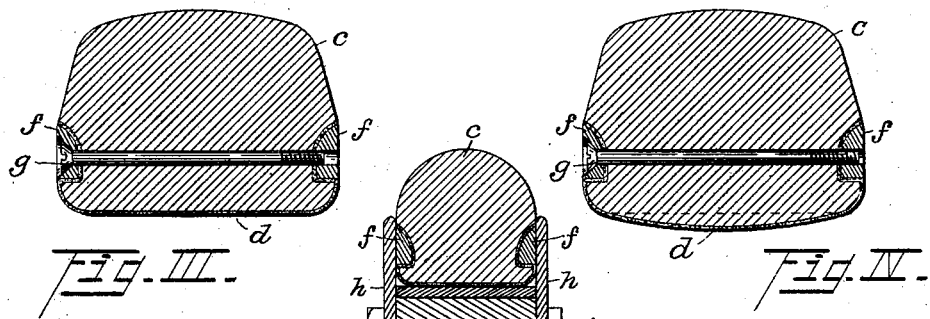
Witnesses:
Inventor
William C. Lilly,
by Luther G. Hopper,
Attorney.

UNITED STATES PATENT OFFICE.

WILLIAM CHAMP LILLY, OF AKRON, OHIO.

ELASTIC WHEEL-TIRE.

SPECIFICATION forming part of Letters Patent No. 718,645, dated January 20, 1903.

Application filed December 27, 1901. Serial No. 87,511. (No model.)

*To all whom it may concern:*

Be it known that I, WILLIAM CHAMP LILLY, a citizen of the United States, residing at Akron, in the county of Summit and State of Ohio, have invented certain new and useful Improvements in Elastic Wheel-Tires, of which the following is a specification.

This invention relates to cushion-tires for vehicle-wheels, and has for its purpose the provision of a tire of rubber or other elastic material, together with improved means for retaining said elastic tire upon the periphery of a wheel.

It has been found in practice that any attempt to secure a rubber tire to a wheel, so as to prevent its creeping around the same—as, for instance, by means of bolts passing through both the tire and the felly or flanges of the wheel—results in the tire tearing away from the fastening. Likewise a fastening consisting of small wires cored in or arranged in grooves in the tire and running longitudinally thereof around the wheel has also a tendency to tear through the tire. Therefore a fastening means which will not tear out and which will hold the tire in close frictional contact to the wheel, but permit of its creeping around the wheel rather than tearing loose from its fastening, is the prime object my invention is intended to attain. Minor objects will become apparent from the description.

To these ends my invention consists in the novel features, arrangements, and combinations hereinafter described and claimed, an embodiment thereof being illustrated in the accompanying drawings, in which—

Figure I is a cross-section of a tire and felly of a wheel; and Fig. II is a side elevation of the same, showing a portion of the side plate broken away. Fig. III is a cross-section of a tire; and Fig. IV is a section of the same, showing the natural change in the shape of the tire due to the compression of the side rings. Fig. V is a section of a tire and felly of a wheel, showing a modified form of the device.

Referring to the figures, the letter $a$ indicates the wheel-felly, and $b$ is the usual flat metal tire. In case a metallic felly is employed the flat tire $b$ would not be required. Surrounding and fitting closely to the flat metal tire is a rubber tire $c$, having a flat base $d$, rounded corners between the base and the sides, and sides which would be at right angles with the base and substantially straight for some distance therefrom, except for the grooves $e$, and their outer portions converging inwardly, as in the usual type, to join the rounded tread or periphery of the tire. The base $d$, the grooves $e$, and the rounded corners between them are preferably reinforced, as shown, by one or more layers of a suitable fabric, such as canvas, adjacent to the surface thereof.

Fitted to rest snugly in the respective grooves $e$, with their outer flat surfaces substantially corresponding to and flush with the aforesaid perpendicular inner portions of the sides of the tire, are metallic rings $f$, preferably of rolled steel, welded and formed into hoops of the proper diameter and having a cross-section preferably, but not necessarily, similar to that shown in the drawings. The purpose of these rings is both to prevent the tire being rolled out of its seat upon the wheel by reason of transverse strains and also to compress the tire laterally, thereby causing it to bulge inwardly, tending to shorten its inner diameter, through which action the tire is made to embrace the wheel more closely and produce sufficient friction not only at the sides of the base adjacent to the rings, but between the entire base and the wheel, to keep the tire from slipping under all ordinary conditions of service. This result may be accomplished in small carriage-tires by the side plates $h$, consisting of flat annular rings placed upon opposite sides of the felly and extending outwardly to or slightly beyond the outer edges of the rings $f$ and secured to the felly by bolts $j$, passing laterally therethrough; but while this construction, as more clearly shown in Fig. V, may be employed upon some small tires the clamping action of the side plates alone would not produce a satisfactory result in heavier tires and upon traction-wheels. Therefore in said latter cases I employ means, such as bolts $g$, extending crosswise through the rings $f$ and the tire, said bolts being preferably screw-threaded into one ring and having a slotted head countersunk in the other and spaced at equal intervals throughout the circle of the tire, whereby said rings may be drawn in against the tire until the requisite frictional contact between the tire and the wheel is secured. The action of these bolts and rings will readily be seen by reference to the drawings, in which Fig. III represents a tire with the rings in place and the thread of the bolt just started in the tapped ring, the base $d$ of the tire being normally straight. In Fig. IV the bolt is shown screwed farther into the tapped ring, thus drawing the rings closer together and causing the base $d$ of the tire to bulge downward. When such a tire is forced upon a wheel, being a snug fit thereto when the bolts and rings are in the position shown in Fig. III and the bolts and rings then drawn up, as in Fig. IV, it is evident that the base $d$ cannot bulge, but is compressed throughout its entire surface, producing a maximum amount of frictional contact. The side plates $h$ are then bolted in place, which not only keep the tire in position, but are designed to fit closely, so as to effect some additional resistance to prevent the tire slipping lengthwise around the wheel.

It will now be obvious that the danger of the rubber tire tearing away from the fastening members is in this construction eliminated, since the rings $f$ always move with the tire in case the latter is strained sufficiently to cause it to creep around the wheel.

While I prefer a continuous rubber tire made up and vulcanized in a circular form, it is possible where means such as the bolts $g$ are used to employ a jointed tire under some conditions.

Changes may be made in the construction of the side plates $h$ without departing from the spirit of my invention. Modifications may also be made in other details of my invention, provided the principles of construction set forth respectively in the following claims are employed.

Therefore what I claim as new, and desire to secure by Letters Patent, is—

1. The combination, with a wheel-felly provided with suitable tire-retaining plates on its sides, of a rubber tire surrounding and fitting closely to said felly having oppositely-disposed open grooves located respectively in the inner divisions of the sides thereof, continuous metallic rings unattached to the wheel fitted to lie in the respective grooves having flat outside faces substantially flush with the sides of the tire, and means by which said rings may be forced laterally toward each other to hold the tire in compression between them, substantially as set forth.

2. The combination, with a wheel-felly provided with removable tire-retaining plates on its sides, of an elastic tire surrounding and fitting closely to said felly having oppositely-disposed open grooves located respectively in the inner divisions of the sides thereof, metallic hoops fitted to lie in the respective grooves having their outside faces substantially flush with the sides of the tire, and means comprising transverse bolts whereby said hoops may be forced toward each other holding the tire in compression between them and against the wheel, substantially as set forth.

3. The combination of a wheel-felly, a metallic tire thereon, removable tire-retaining plates extending on each side beyond said metallic tire, an elastic tire surrounding and fitting closely to said metallic tire having oppositely-disposed open grooves located in the respective inner divisions of its sides, continuous metallic rings unattached to the wheel fitted to lie respectively in said grooves having their outside faces substantially flush with the sides of the elastic tire, and means whereby said rings may be forced laterally against the elastic tire and hold said tire in compression between them and against the metallic tire, substantially as set forth.

4. The combination of a wheel-felly, a metallic tire thereon, tire-retaining side plates bolted to the felly and extending beyond said metallic tire, an elastic tire surrounding and fitting closely to said metallic tire having oppositely-disposed open grooves located in the respective inner divisions of its sides, metallic rings fitted to lie respectively in said grooves having their outside faces substantially flush with the sides of the elastic tire, and transverse bolts passing through said rings and elastic tire adapted to draw said rings toward each other and compress the elastic tire between the rings and against the metallic tire, substantially as set forth.

In testimony whereof I affix my signature, in the presence of two subscribing witnesses, at Akron, Ohio, December 14, 1901.

WILLIAM CHAMP LILLY.

Witnesses:
M. W. METZLER,
JESSE P. DICE.